United States Patent [19]

Plester et al.

[11] Patent Number: 5,106,597
[45] Date of Patent: Apr. 21, 1992

[54] DISPOSABLE GAS GENERATOR CARTRIDGE AND VESSEL THEREFOR FOR USE IN A BEVERAGE DISPENSER

[75] Inventors: George Plester, Essen; Horst Kohl, Bad Oldesloe; Rolf Preuss, Ratzeburg; Georg Troska, Herten, all of Fed. Rep. of Germany; Frederick D. Schorr, Decatur, Ga.

[73] Assignee: The Coca-Cola Company, Atlanta, Ga.

[21] Appl. No.: 551,077

[22] Filed: Jul. 11, 1990

[51] Int. Cl.$^5$ ............................. B01J 7/00; C12G 1/06
[52] U.S. Cl. ..................................... 422/305; 422/236; 99/323.2; 220/278; 222/5; 222/325; 261/DIG. 7; 426/477
[58] Field of Search ..................... 422/120, 236-238, 422/305; 99/323.1, 323.2; 261/DIG. 7; 426/474, 477; 215/259; 220/85 P, 278; 222/5, 129.1, 325; 206/0.6

[56] References Cited

U.S. PATENT DOCUMENTS

| | | | |
|---|---|---|---|
| 27,775 | 4/1860 | Chamberlain | 422/236 |
| 414,691 | 11/1889 | Feld et al. | 422/238 |
| 767,289 | 8/1904 | Kirkwood | 422/238 |
| 875,186 | 12/1907 | Kirkwood | 422/238 |
| 1,072,351 | 9/1913 | Munson | 422/236 |
| 2,644,313 | 7/1953 | Griggs | 206/0.6 |
| 3,587,926 | 6/1971 | Lherault | 222/5 |

Primary Examiner—Robert J. Warden
Assistant Examiner—Stephanie Blythe
Attorney, Agent, or Firm—Birch, Stewart, Kolasch & Birch

[57] ABSTRACT

A disposable $CO_2$ gas generator cartridge of cylindrical construction and including inner and outer coaxial reagent chambers which are interconnected when installed in a cylindrical pressure vessel and having a top cover assembly including a pusher type activating mechanism which is operated by a cam surface located on a handwheel. The cover assembly connects to a carbonated drink dispenser by means of a quick disconnect coupling activated by the operation of a manually operated pull down lever assembly including the handwheel. Operation of the handwheel acts to start gas generation and also vent the cartridge to atmosphere when spent.

33 Claims, 11 Drawing Sheets

DISPOSABLE GAS GENERATOR CARTRIDGE AND VESSEL THEREFOR FOR USE IN A BEVERAGE DISPENSER

CROSS REFERENCE TO RELATED APPLICATION

This application is related to U.S. Ser. No. 07/525,067, filed on May 18, 1990, which is a Continuation-in-Part of U.S. Ser. No. 07/423,697 and titled "Supply of Controlled, Medium-Pressure $CO_2$—Gas In Simple, Convenient Disposable Packaging". This related application is also assigned to the assignee of the present application.

BACKGROUND OF THE INVENTION

The present invention relates generally to gas generators and associated apparatus and more particularly to a disposable $CO_2$ gas generator cartridge which utilizes chemical reactants to generate the $CO_2$ gas and the vessel in which it is housed for use in a beverage dispenser.

Conventional $CO_2$ gas cylinders in beverage dispensers are heavy, relatively expensive and available only as returnable, refillable packages. Since such cylinders are under very high pressure, handling also requires appropriate care.

With the trend toward mini-sized and home dispensers for soft drinks, where the syrup packaging is generally one way, it is logistically attractive to make one way $CO_2$ generators also available. Moreover, certain conventional distribution channels, such as supermarket stores, could only be effectively exploited if one-way gas generators were available. An additional factor is that lay dispenser users are understandably nervous of handling high pressure gas cylinders. High pressure $CO_2$ capsules, generally containing about 8 g $CO_2$, are already available, but these are expensive and restricted in practical capacity to a limit of around 16-20 g. They do not, therefore, represent a desired solution, since such quantities are barely sufficient for carbonating two liters of beverage without reckoning the considerable additional $CO_2$ quantities needed for propulsion of the beverage in the dispenser. Inexpensive, light weight, unpressurized or moderately pressurized $CO_2$ generators packaged in disposable containers could therefore provide a whole scope of new business opportunities with respect to small sized dispensers designed for non-professional users.

In the above referenced related application, which is meant to be incorporated herein by reference, there is shown and described a plurality of first generation disposable $CO_2$ gas generators which package reactant chemicals within a system which releases $CO_2$ at a predetermined pressure on demand, thus allowing the chemicals to be consumed only as and when $CO_2$ is drawn off, whereby the chemicals react just sufficiently to maintain the required user pressure.

SUMMARY OF THE INVENTION

Accordingly, it is an object of the present invention to provide an improvement in gas generators which enables the generation of a carbonating gas on demand.

It is another object of the present invention to provide an improved carbonating gas generator which is also portable and easily deliverable for use in a beverage dispenser.

It is yet another object of the present invention to provide a normally dormant carbonation gas generator which, when activated upon being inserted in a vessel associated with a beverage dispenser, generates gas at or near a desired user pressure.

It is still another object of the present invention to provide a disposable non-pressurized device which can be placed in a vessel for use in a beverage dispenser to subsequently generate $CO_2$ automatically by mixing prepackaged reagents and thereafter maintaining a predetermined reference pressure therein.

The foregoing and other objects are realized by a carbonating gas generator and vessel therefor which uses a substance, such as sodium bicarbonate, in combination with a liquid acid, typically phosphoric acid, to generate a gas, namely, carbon dioxide ($CO_2$). The chemicals are packaged within a system so that they remain out of contact with each other until use is desired whereupon they are brought into contact under self-controlled conditions causing $CO_2$ to be generated and released at a predetermined pressure. The system allows the chemicals to be consumed only as and when $CO_2$ gas is drawn off, i.e. on demand, whereby the chemicals react just sufficiently to maintain the required user pressure. The system includes a disposable cartridge of cylindrical construction containing inner and outer coaxial reagent chambers which are interconnected when installed in a vessel having a top cover assembly including an activating mechanism which connects to a $CO_2$ dispenser by means of a quick disconnect coupling including an activator for delivering $CO_2$ to the carbonator portion of a beverage dispenser.

Further scope of applicability of the present invention will become apparent from the detailed description given hereinafter. However, it should be understood that the detailed description and specific example, while indicating the preferred embodiment of the invention, is given by way of illustration only and is not meant to be interpreted in a limiting sense, since various changes and modifications within the spirit and scope of the invention will become apparent to those skilled in the art.

BRIEF DESCRIPTION OF THE DRAWINGS

The following detailed description of the invention will be better understood when considered together with the accompanying drawings wherein.

DETAILED DESCRIPTION OF THE INVENTION

Figure 1A:
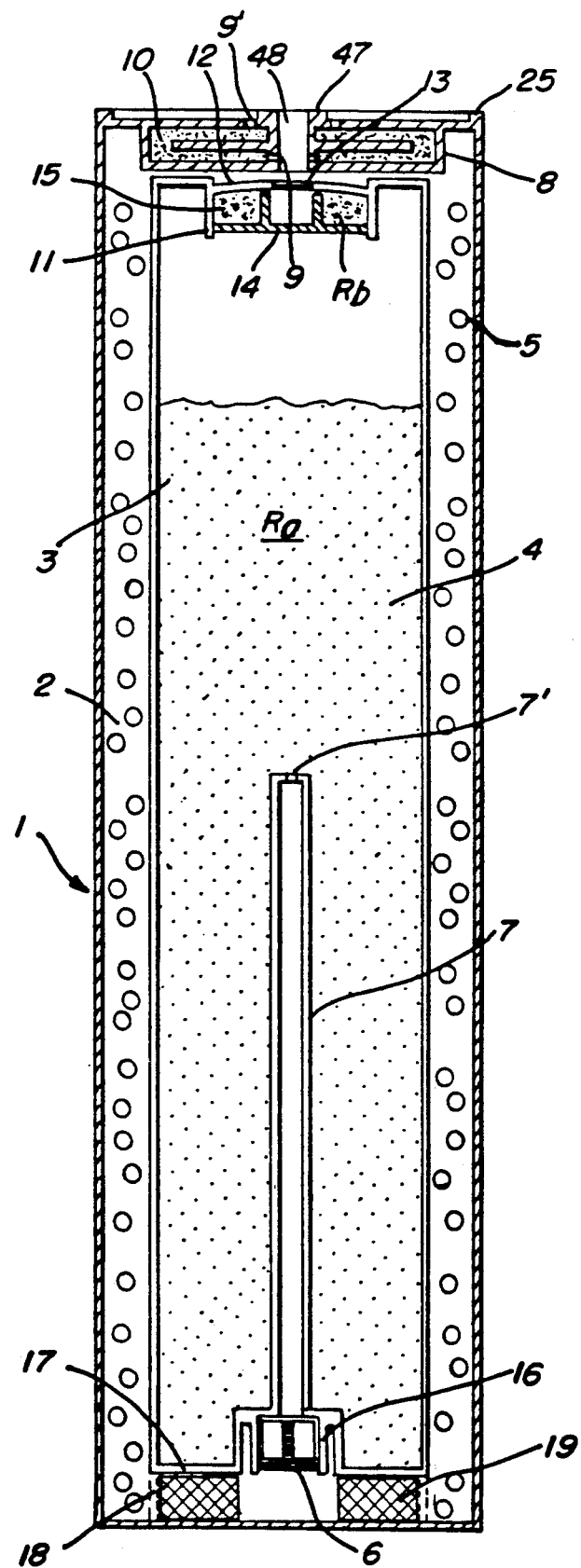
FIG. 1A is a central longitudinal cross sectional view of a gas generator cartridge according to the subject invention.

Referring now to the drawings, FIG. 1A is illustrative of a disposable cartridge 1 comprised of a pair of reagent storage chambers consisting of an outer container 2 and an inner container 3, both cylindrical in shape and mutually coaxial. A first reagent $R_a$ comprising a liquid acid 4 is placed in the inner container 3 and a second reagent $R_b$ comprising solid bi-carbonate pellets 5 are placed in the outer container 2. The choice of liquid acid, acid dilution, and bicarbonate is selected so as to provide desired reaction characteristics, i.e. final $CO_2$ yield, reaction rate, $CO_2$ purity, pH of spent agents, etc. The liquid acid 4 and bicarbonate pellets 5 are separated by a knock out plug 6 located at the bottom of an elongated centrally located stand-pipe 7 formed in the inner container 3. The stand-pipe 7 limits the amount of liquid reagent $R_a$ which can flow from the inner container 3 to the outer container 2 when the plug 6 is removed, this limit being equivalent to the available free space left by the reagent $R_b$ in the outer container 2. The stand-pipe 7 thus ensures that no liquid reagent $R_a$ can reach a gas outlet port located at the top of the cartridge 1.

The cartridge 1 further includes a gas filter section 8 including a gas inlet port 9. The filter section 8 includes a tortuous path for the $CO_2$ leaving the cartridge 1 and is filled with filter material 10, which operates to filter the entrained acid vapor. The filter material 10 is granulated bicarbonate or activated carbon or any other substance which can effectively remove traces of reagent 4 from $CO_2$ gas reaching the outlet port 9.

Figure 5A:
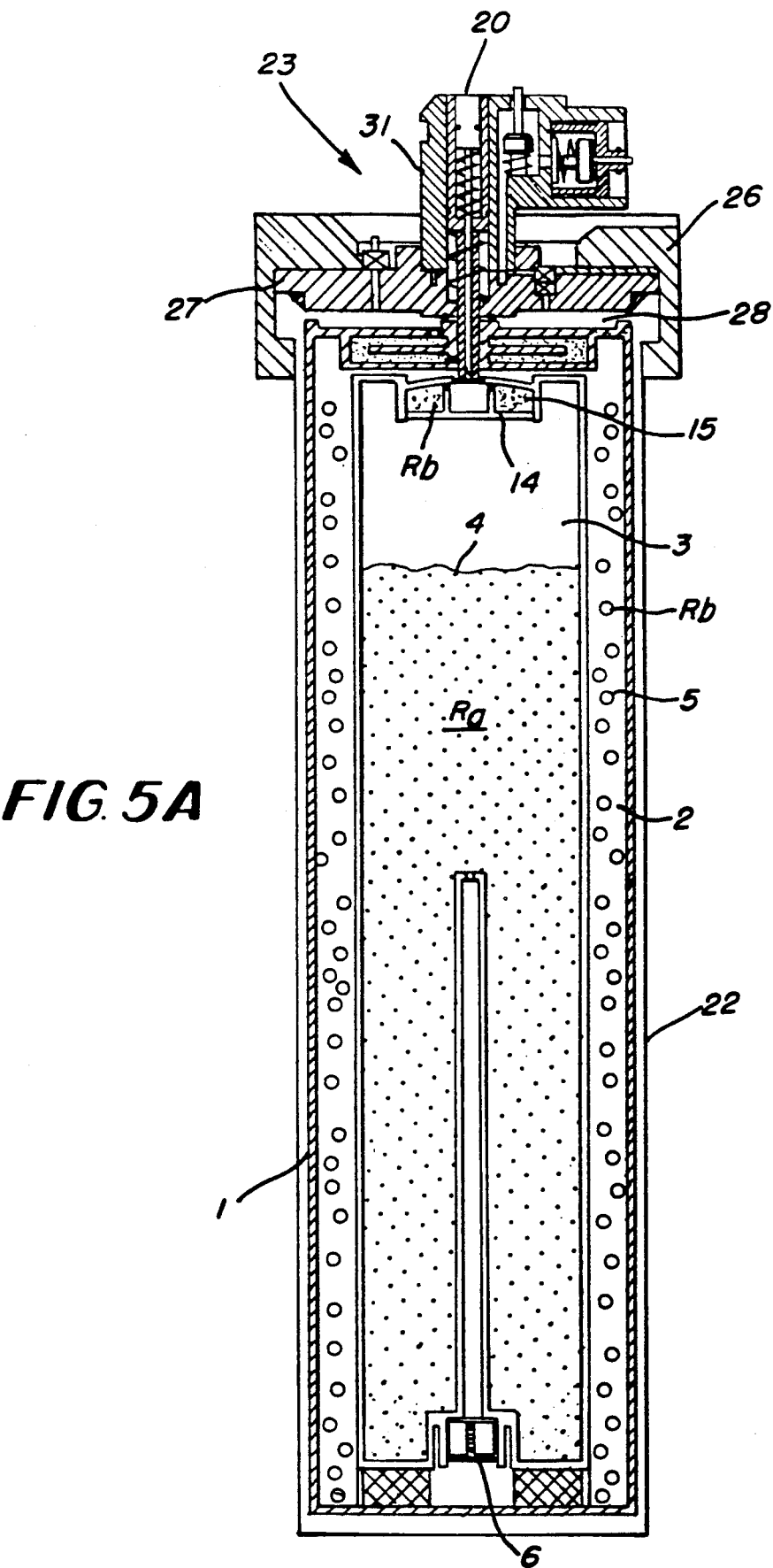
FIGS. 5A-5E are central longitudinal views illustrative of the operation of the apparatus shown in FIGS. 2-4.
Figure 5B:
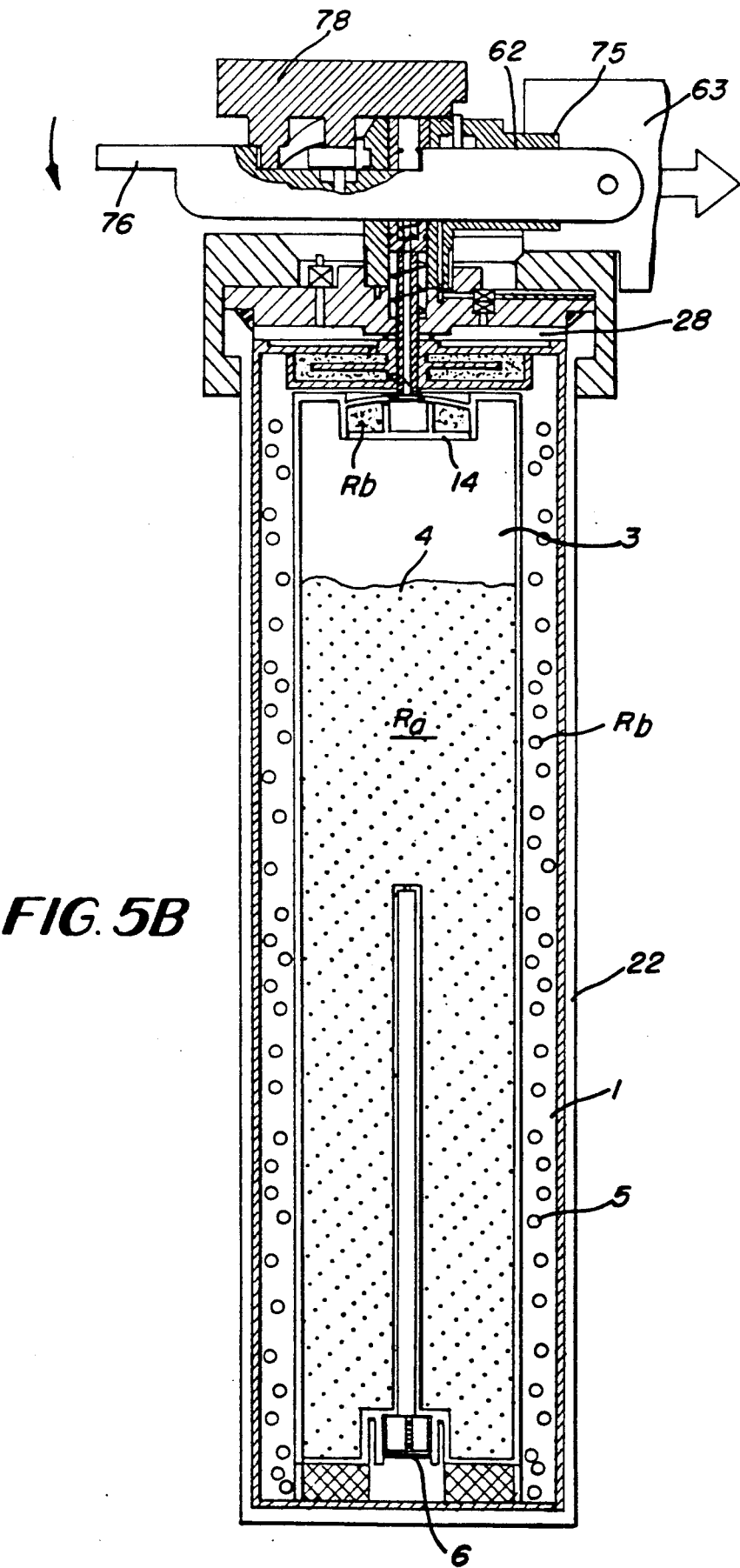

A reaction starting section 11 is also formed at the top of the inner container 3 and is comprised of a domed shell having a flexible roof member 12 including a sealed opening including a rubber seal 13. An upwardly turned removable plug 14 blocks the mouth of the starting section 11 which is fitted thereto. The plug 14 contacts the flexible roof member 12 which is designed to spring downward once pressed from above beyond a certain point. The purpose of the plug 14 is to hold a predetermined amount of reagent $R_b$ e.g. powdered bicarbonate in the domed shell of the starting section 11 and shown by reference numeral 15. When the flexible roof member 12 is pressed down, it springs from an initial convex shape as shown in FIG. 5A to a concave shape as shown in FIG. 5B, and in doing so pushes the plug 14 out of the starting section 11 and ejects reagent 15 into the reagent 4 comprising the liquid acid 4. This causes $CO_2$ gas to be generated in the head space of the inner container 3.

The quantity of reagent $R_b$ in the starting section 11 is selected so as to provide a precisely predetermined starting pressure in inner container 3 when domed roof 12 is depressed by a downward force.

The starting pressure thus generated in inner container 3 forces reagent $R_a$ (liquid acid) 4 into an orifice 7' at the top of the stand-pipe 7 where it then forces the knock-out plug 6 from a seating portion 16 of the stand-pipe 7 so as to feed liquid reagent $R_a$ in the inner container 3 to the solid reagent 5 in the outer container 2 via the passage 17 at the bottom of the cartridge. The passage 17 between outer container 2 and inner container 3 which also includes a screen 18 and is filled with filter material 19 such as cotton-wool wadding so as to prevent powdered bicarbonate, or other solid reagent $R_b$ from being carried into the inner container 3 through the stand-pipe 7.

Figure 2:
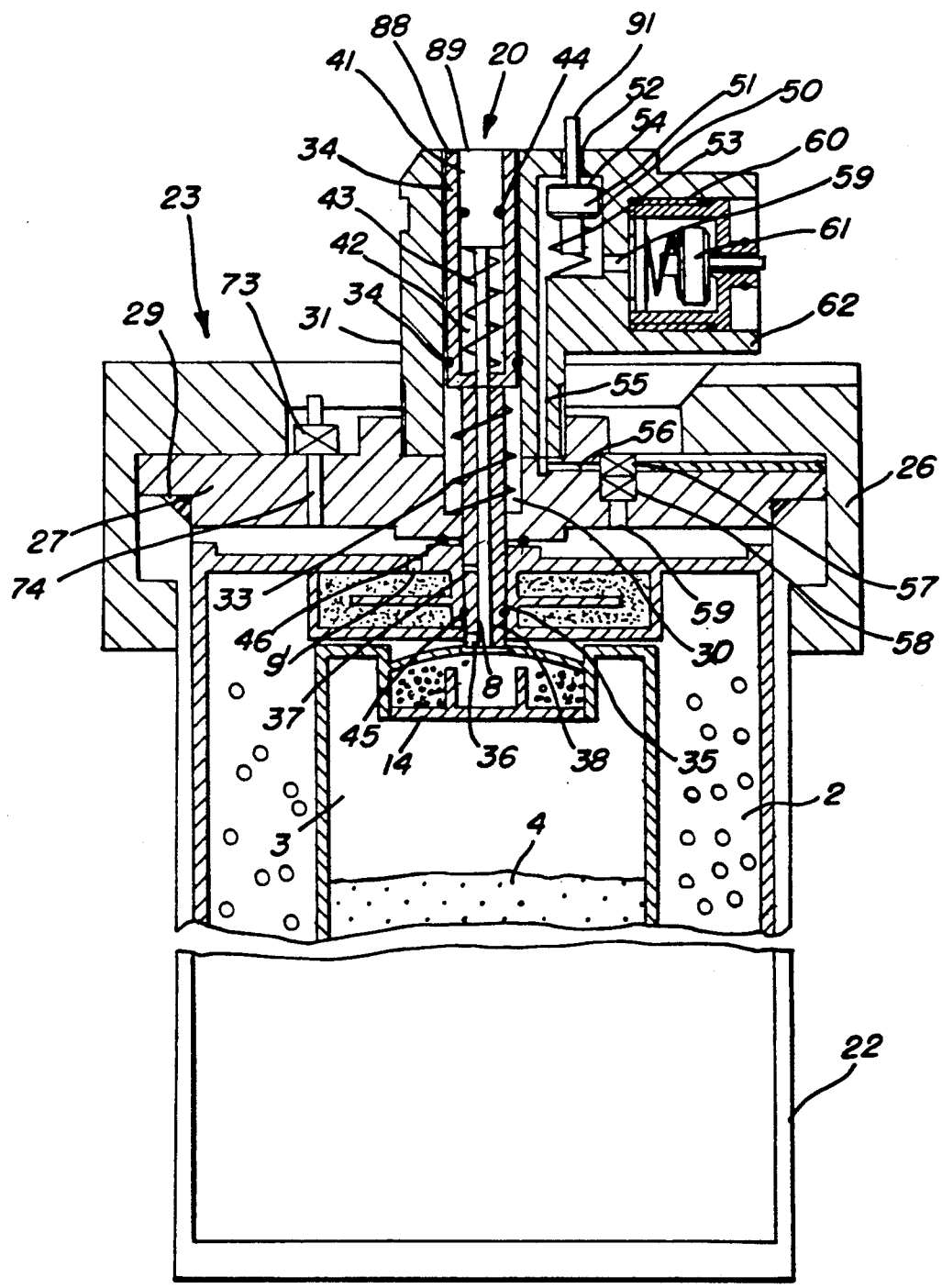
FIG. 2 is a central longitudinal cross sectional view partially illustrative of the coupling and activating assembly for the cartridge shown in FIG. 1A.
Figure 3:
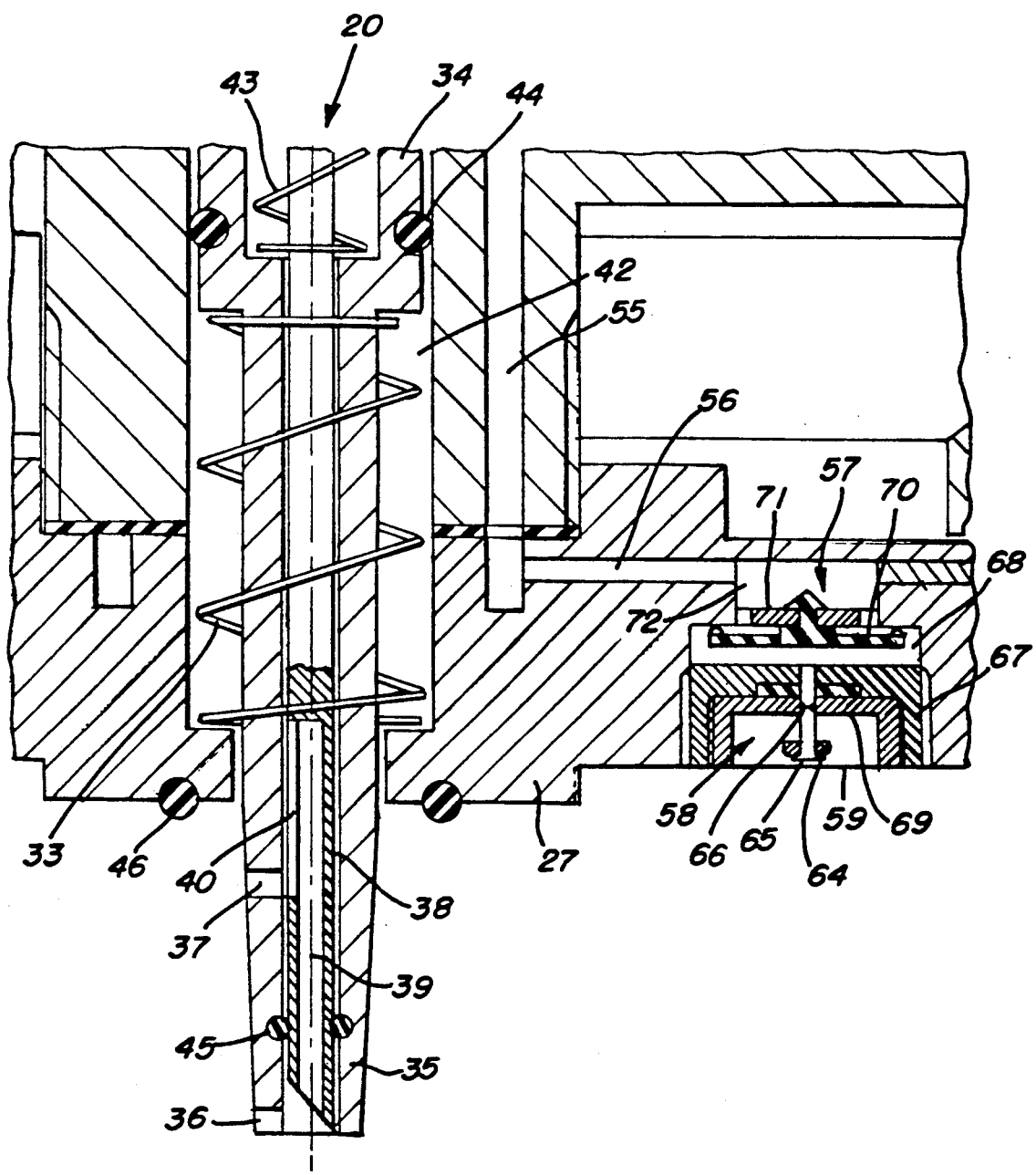
FIG. 3 is an enlarged partial cross sectional view of the activating mechanism shown in FIG. 2.

When the reagent $R_a$, i.e. liquid acid 4, mixes with the reagent $R_b$, i.e. bicarbonate pellets 5, $CO_2$ is formed and rises to the head space at the top of the outer container 2 where it passes over the top of the starting section 11 of the inner container 3 and is coupled to the port 9 through a spring loaded pusher assembly 20 as shown in FIGS. 2 and 3 where it passes to an outlet port 9' after passing through the filter material 10.

Figures 1B, 1C:
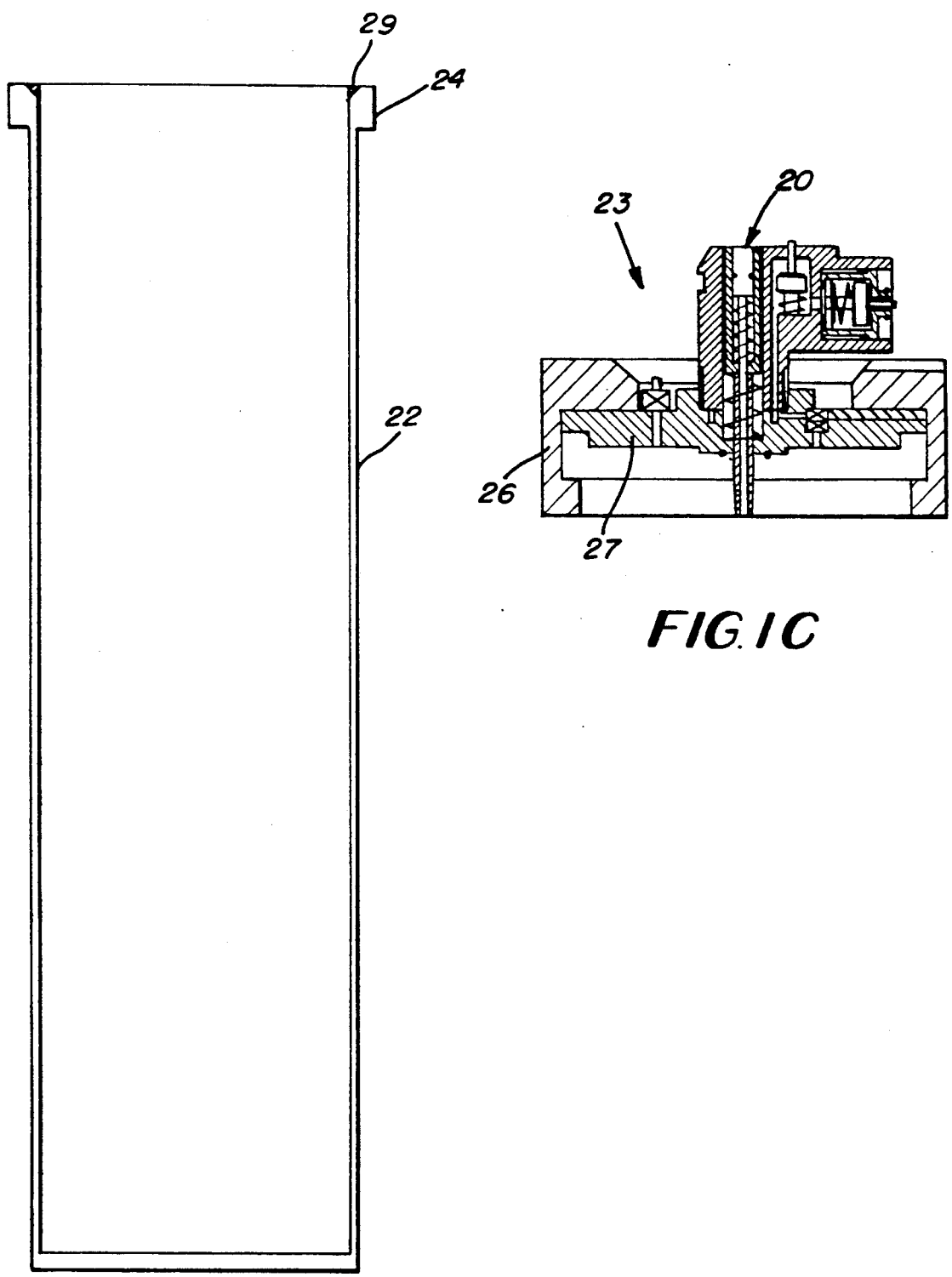
FIG. 1B is a central longitudinal cross sectional view of a vessel for receiving the cartridge shown in FIG. 1A.
FIG. 1C is a central longitudinal cross sectional view of the top cover assembly for the cartridge and vessel shown in FIGS. 1A and 1B.
Figure 1D:
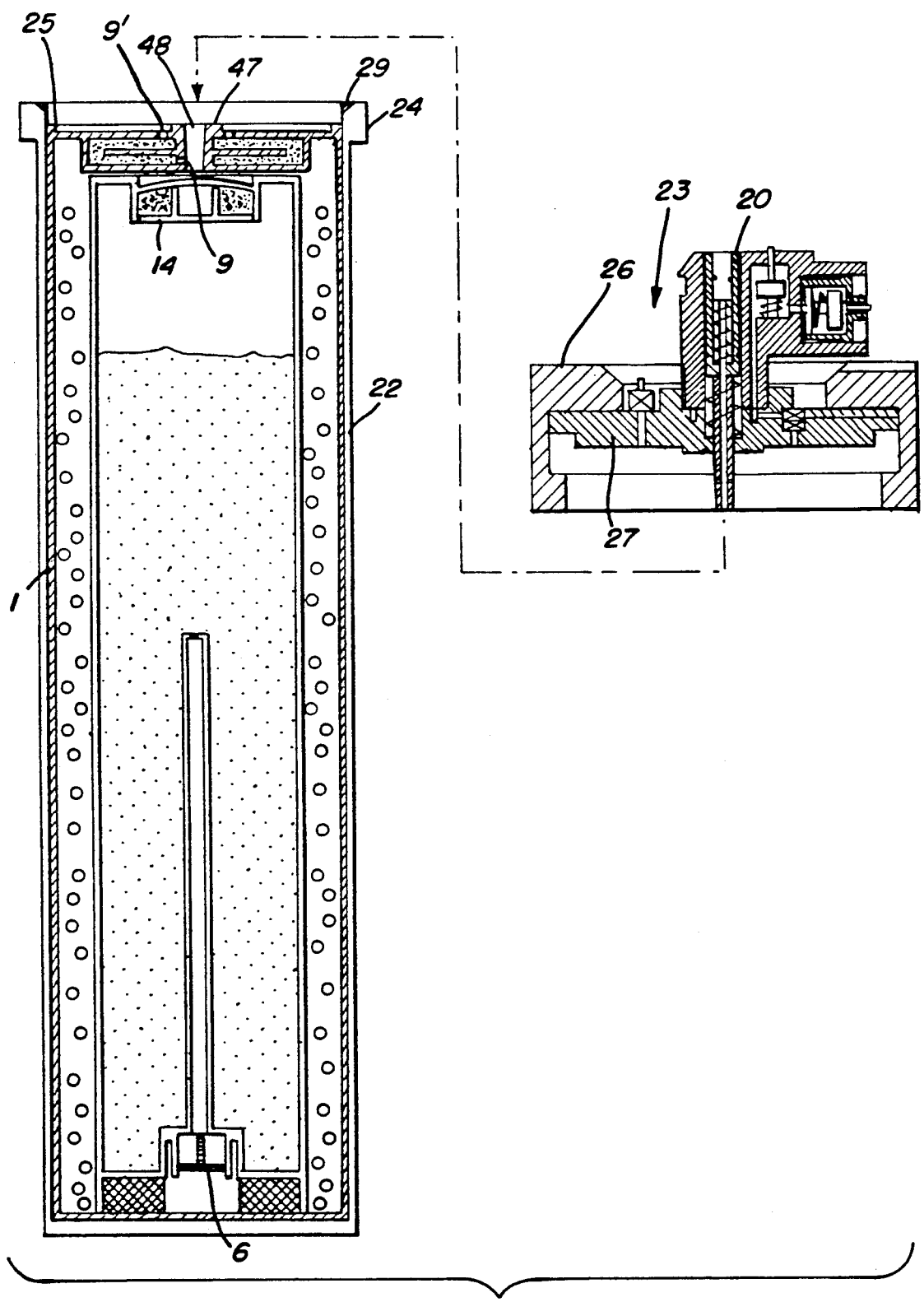
FIG. 1D is an exploded central longitudinal view illustrating the assembly of the three components shown in FIGS. 1A, 1B and 1C.

Referring now to FIGS. 1B and 1C, reference numeral 22 designates a pressurized outer vessel into which the cartridge 1 is inserted, as shown in FIG. 1D. A cover assembly 23 is secured to the rim 24 of the vessel 22 where it rests on the rim 25 (FIG. 1A) of the cartridge 1. The cover assembly 23 is comprised of three primary components: a twist-on locking ring 26, a cover member 27 and the pusher assembly 20. A sealing gasket 29 is also employed between the cover element 27 and the rim 24 of the pressure vessel when assembled.

Referring now to FIGS. 2 and 3, the pusher assembly 20 is located in a bore 30 of a body member 31 and is sealed therein by an O-ring 32 and maintained in its topmost rest position by a spring 33. When a downward force is exerted on a first pusher member 34, it is free to move down vertically compressing spring 33. The member 34 includes a hollow end section 35 as further shown in FIG. 3, and contains two side openings therein as shown by reference numerals 36 and 37. A partially hollow needle type member 38 having an internal channel 39 and a side aperture 40, for connecting the openings 36 and 37, is slidably located in the end section 35. The needle member 38 terminates in a second pusher member 41 which is located in a bore 42 of the first pusher member 34 and is biased outwardly by a second relatively smaller diameter spring 43. The second pusher member 41 is further sealed in the bore 42 by an O-ring 44. Another O-ring 45 is used to seal the lower part of the needle type member 38 against the end section 35. A fourth O-ring 46 is used to seal the cover member 27 against a raised inner rim 47 (FIG. 1A) surrounding a central opening 48 in the cartridge 1, forming a $CO_2$ flow region 28 thereby.

In operation, $CO_2$ gas at the top of outer container 2 can flow into the opening 36 in the end section 35 of the pusher member 34 to the internal channel 39 of the needle member 38, then out through opening 37 via the side aperture 40 where it enters the cartridge filter section 8 through its inlet port 9 which is positioned to line up with the opening 37 where it then travels through the filter to the outlet port 9'. From the outlet port 9' $CO_2$ gas passes to a port 59 in the cover 27 via the region 28. When a downward force is exerted on the pusher member 41 of the needle 35, as will be shown subsequently, it is free to move down vertically compressing spring 43.

The body member 31 also includes a $CO_2$ vent valve including chamber 50 which has a vertically moving spring biased piston 51 mounted in an opening 52 which in turn is retained in a topmost position by an expansion type spring 53. The face of piston 51 has a sealing gasket 54 affixed thereto which normally prevents gas from venting through opening 52. When the piston 51, however, moves downwardly, as will be shown, $CO_2$ gas is permitted to vent to the outside through the opening 52 past the valve stem. The piston 51 is designed to have a weight which is just balanced by spring 53, so that it compresses the spring 53 and opens the vent opening 52 as soon as gas pressure within the cartridge 1 (FIG. 1) drops to a predetermined nominal level (e.g. 0.1 bar). The vent chamber 50 is connected to the top of the cartridge 1 and the port 59 by a vertical channel 55 and a horizontal channel 56. A flow resistor 57 and an attitude sensitive valve 58, the details of which are shown in FIG. 3, are located between the port 59 and the channel 56.

Figure 4:
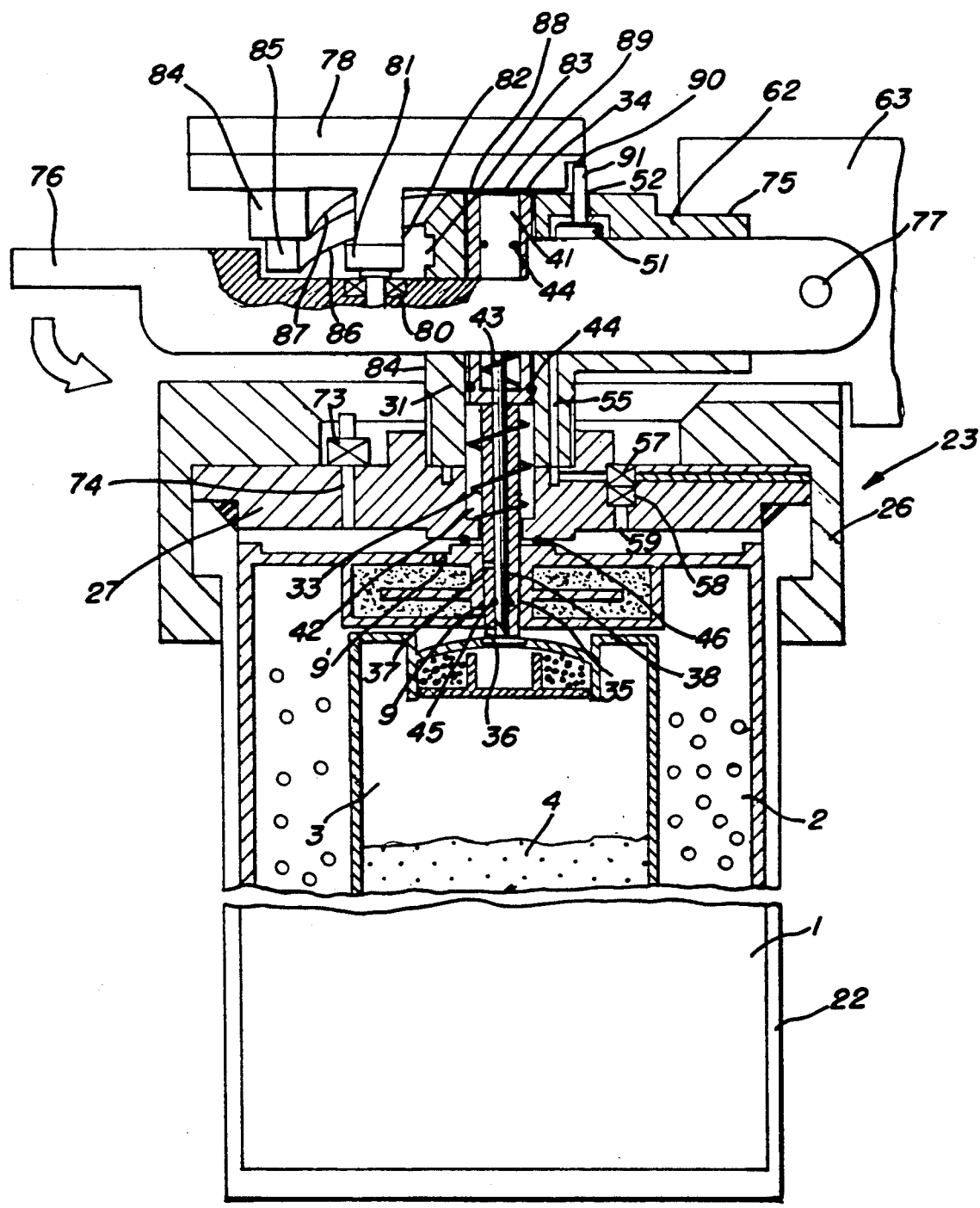
FIG. 4 is a central longitudinal view partially in cross section which illustrates additional details of the activating mechanism shown in FIG. 2 and activator therefor.

When the vent valve 51 is closed under pressure, $CO_2$ gas flows past it to an output channel 59, which in turn leads to a conventional spring biased output valve assembly 60 which includes a self-closing spring biased valve 61 located in a male fitting 62 which is pressed into an opposing female fitting, not shown, located in a dispenser assembly shown generally by reference numeral 63 in FIG. 4.

As shown in FIG. 3, the attitude sensitive valve 58 shuts off flow of the $CO_2$ if the assembly of FIG. 1D should be tipped beyond, for example, an angle of 45° to vertical. The valve 58 consists of a small piece of rubber tubing 64 at the bottom of which is located a weight 65. This ensures that the tube 64 hangs vertically. The tube 64 includes a pinch point 66 and hangs in a pinch ring assembly 67. The pinch-ring assembly 67 is secured in a circular opening 68 of the container cover 27. Any significant deviation off of the vertical causes the member 69 to pinch the tube 64 at the pinch point 66 and close it off. Thus the valve 58 prevents acid or other liquids from entering the region 68 and the gas outlet channel 56 should the equipment be misused and tipped out of vertical, which would normally not occur since the system can only be started when the cartridge 1 is fitted into the vessel 22 and which is thereafter installed in a drink dispenser or other type user equipment. The flow restrictor 57, on the other hand, comprises a rubber diaphragm 70 attached to an apertured disc 71 mounted in a circular opening 72 which intersects the horizontal channel 56. As gas flow increases, the rubber diaphragm 70 is pressed against the apertures 71 of the disc 70, thus restricting $CO_2$ flow into the channels 55 and 56 leading to output valve assembly 60. Completing the structure shown in FIG. 2, $CO_2$ exits outlet port 9' where it is fed to the port 59 in the cover element 27 via the $CO_2$ flow region 28 intermediate the cover 27 and the top of the canister 1 between the inner and outer rims 25 and 47 thereof. A pressure relief valve 73 of a conventional type, whose purpose is to provide an emergency pressure release if an unforeseen gas pressure build up occurs in the cartridge 1, is attached to cover 27 at the location of a small vertical bore 74 through the cover and communicates with the flow region 28.

Having shown the details of the disposable, renewable cartridge 1, the pressure vessel 22 in which it is placed, and the cover assembly 23 therefor which make up a composite $CO_2$ generator unit for installation in a dispenser, reference will now be made to FIG. 4 where there is shown the details of an activator and coupling assembly which is used for attaching the $CO_2$ generator as shown in FIG. 2 to the dispenser 63. The male fitting 62 is designed to provide a quick release coupling when pressed into a mating counterpart located in a bore 75. A pivoted lever 76 attached to the dispenser 63 at point 77 includes a manually operable handwheel 78. The handwheel 78 is free to rotate in a single direction by being located in a conventional shaft and bearing 79 which also includes a ratchet which restrains rotation of the handwheel 78 to a single direction, clockwise, looking down from the top of the apparatus as shown in FIG. 4. The handwheel includes an outwardly projecting element or tooth 81 on the shaft 82 which rotates with the handwheel 78 so as to engage a slot 83 formed in the side surface 84 of the body member 31. As the handwheel 78 is rotated clockwise, the tooth 81 engages the slot 83 and prevents the $CO_2$ generator unit from being uncoupled from the dispenser body 63. It moreover prevents the lever 76 from being raised until a full operating cycle, to be described hereinafter, has been completed.

The handwheel additionally includes a pair of cams 84 and 85 having respective cam surfaces which operate to engage the top surfaces 88 and 89 of the plunger member 88 and the needle type member 41. A third cam surface 90 is formed on the perimeter of the handwheel 78 for engaging the valve stem 91 of the vent valve 51.

Referring now to FIGS. 5A-5E, shown thereat is the sequence of operations which take place when operating the apparatus according to the subject invention. FIG. 5A is illustrative of the pressure vessel 22 with the cover assembly 23 including the cover 27, the locking ring 26 and pusher assembly 20 secured thereto and with the cartridge 1 ready for use, inserted therein. The apparatus as shown in FIG. 5A constitutes a $CO_2$ generator ready for connection to a dispenser.

FIG. 5B discloses the apparatus shown in FIG. 5A connected to the dispenser 63. This is accomplished by pushing the male portion 62 of the valve assembly 60 (FIG. 2) into the bore 75 followed by a lowering of the lever 76 including the handwheel 78.

Figure 5C:
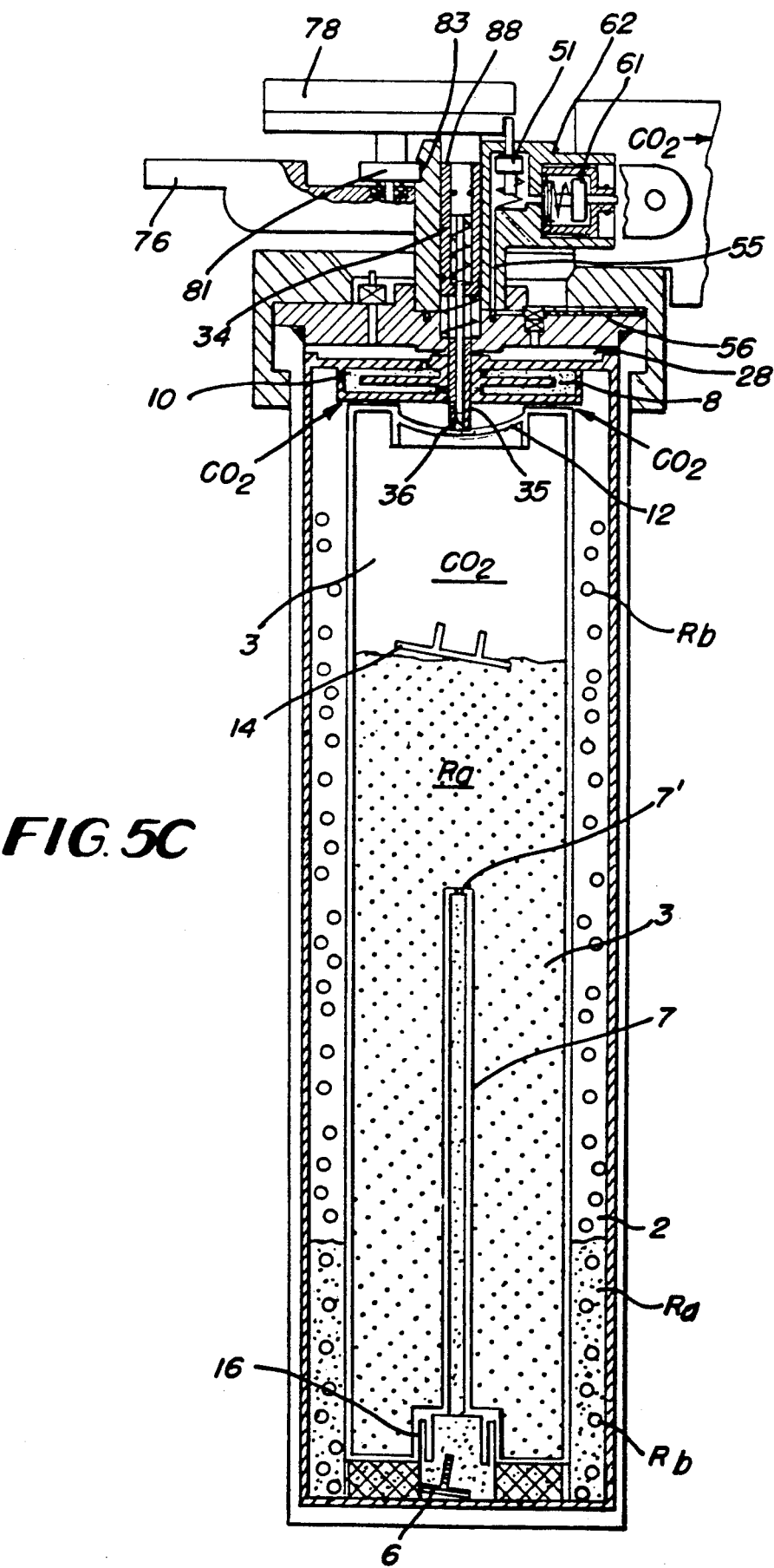

Next as illustrated in FIG. 5C, the handwheel 78 is rotated clockwise. This causes the tooth 81 to engage the slot 83 which locks the apparatus in place on the dispenser. At the same time, the cam 84 presses on the surface 88 of the pusher 34. This causes the end section 35 to depress the flexible domed roof 12 of the starting section 11, causing the plug 14 to be pushed out, whereupon the reagent $R_b$ contained therein falls into the liquid reagent $R_a$ in the container 3, causing $CO_2$ to be generated therein. This results in a pressure build-up which forces the liquid reagent $R_a$ into the standpipe 7, forcing the plug 6 from its seat 16. The liquid reagent $R_a$ flows into the outer container 2 where it then reacts with the reagent $R_b$. $CO_2$ is formed in the outer container 2 where it rises to the top thereof where it flows into the opening 36 of the pusher member 34. The $CO_2$ flows through the needle 38 to opening 37 where it is fed into the filter section 8. Upon leaving the filter section via outlet port 9', $CO_2$ flows into the gas flow region 28 where it is fed to the output valve assembly 61 of the cover assembly 23 via the channels 55 and 56 and as further illustrated in FIGS. 2 and 3.

When the demand for $CO_2$ ceases, the pressure in the outer container 2 rises to equal that in the inner container 3 which acts to push the liquid reagent $R_a$ back into the inner container 3, stopping the reaction. As soon as a further demand for $CO_2$ arises, the pressure in the outer container 2 drops and the liquid reagent reenters the outer chamber 2 to contact the reagent $R_b$. The operation repeats itself in a start/stop mode according to demand.

Figure 5D:
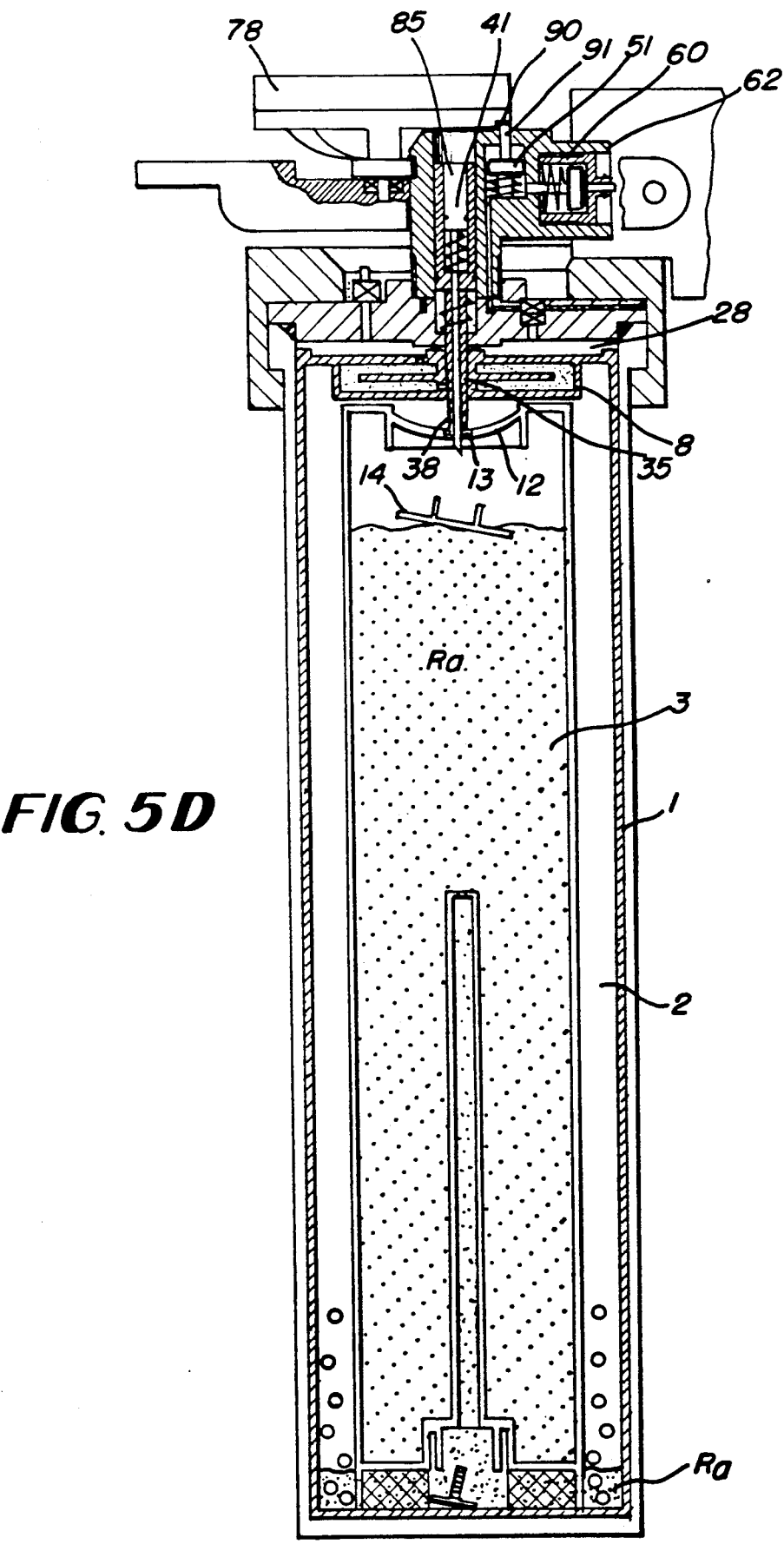

When the cartridge 1 is spent, as shown in FIG. 5D, and prior to its removal from the dispenser 63, the inner container 3 is vented to the atmosphere by a further clockwise rotation of the handwheel 78. This causes the cam surface 85 (FIG. 4) to depress the end of the needle 41, whereupon it projects out from the end portion 35 of the lower end portion 35 of the pusher member 34, to puncture the seal 13. Due to the existence of the side aperture 40 in the needle element 38, as shown in FIG. 3, any $CO_2$ in the upper portion of the inner chamber 3 passes into the filter section 8 from the side opening 37 in the lower section of the pusher member 35 where it exits the canister 1 into the $CO_2$ flow region 28. From there the gas proceeds to the vent valve 51 which is held open by virtue of the cam surface 90 depressing the valve stem 91.

Figure 5E:
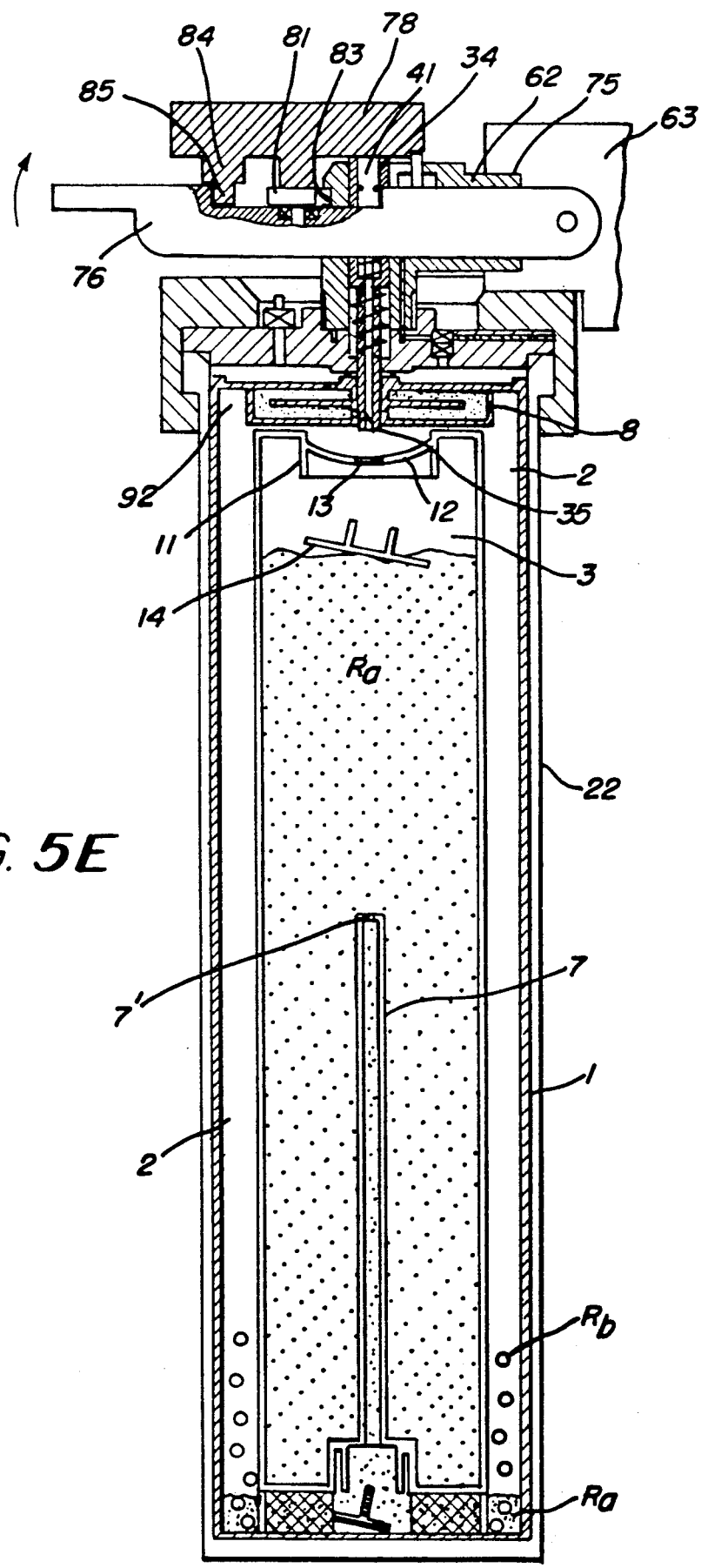

Following venting of the inner container 3, the handwheel 78 is further rotated clockwise, causing the cam surfaces 84 and 85 to release both the plunger member 34 as well as the needle member 41, causing them to retract away from the domed starter section 11 as shown in FIG. 5E. This is accompanied by a resealing of the seal 13. This is further accompanied by a rotation of the tooth 81 out of the slot 83 which, when the lever 76 is moved upward, the $CO_2$ assembly can be pulled back from the dispenser 63, causing the valve portion 62 to be removed from the bore 75 in a quick release disconnection.

Once the $CO_2$ generator has been removed from the dispenser 63, the cover assembly 23 can be opened and the cartridge 1 removed from the container 22, whereupon it can be reloaded with a fresh cartridge and reconnected to the dispenser as described above.

It should be noted that the headroom of the inner container 3 is sealed by virtue of the member 13 and therefore any liquid reagent $R_a$ remaining is trapped within the inner container 3 so that the cartridge 1 can be disposed of safely. Any residual liquid reagent $R_a$ left in the outer container 2 has been neutralized by the reagent $R_b$. It, however, cannot escape since it is trapped in the annulus 92 created between the filter section 8 and the outer container 2.

Having thus shown and described what is at present considered to be the preferred embodiment of the invention, the claimed invention is defined in the following claims.

We claim:

1. Apparatus for chemically generating a gas for a utilization device, comprising:
    a cartridge for generating a gas including a pair of containers having a partition therebetween for defining first and second reagent chambers;
    an elongated reagent feed tube, including a removable closure member, located in said first chamber;
    a passage between one end of said feed tube and said second chamber for permitting the travel of reagent between said chambers;
    a first reagent in said first chamber and a second reagent in said second chamber, said first reagent and said second reagent chemically reacting to generate said gas upon contact with each other, said second chamber including a region in the top portion thereof for holding the gas generated;
    means for starting a reaction between said first and second reagents and including a predetermined portion of said second reagent in the top portion of said first chamber for contacting said first reagent in said top portion thereof for generating a gas thereat and causing a predetermined pressure to be applied to the top of said first reagent in said first chamber to urge said first reagent into the feed tube to remove said closure member and permit said first reagent to traverse said passage and contact said second reagent and thereby generate said gas in said second chamber; and
    a gas outlet port for coupling said gas out of said cartridge.

2. The apparatus as defined by claim 1 wherein said first reagent comprises a liquid reagent.

3. The apparatus as defined by claim 2 wherein said removable closure member comprises a pressure activated plug normally closing one end of the feed tube, said plug being removed from said one end of the feed tube by the predetermined pressure applied to the top of the first reagent.

4. The apparatus as defined by claim 2 wherein said first chamber includes a top wall and wherein said means for starting a reaction includes an inverted section of said top wall and an upwardly turned removable plug in said inverted section for holding said predetermined portion of said second reagent until said removable plug is dislodged from said inverted section.

5. The apparatus as defined by claim 4 wherein said inverted section comprises a domed shell including a flexible roof member engageable with said upwardly turned plug, said roof member when flexed springs toward said removable plug and dislodges said plug and release said predetermined portion of said second reagent.

6. The apparatus as defined by claim 2 wherein there is further provided filter means in the top portion of said second chamber for filtering said gas at the top portion of said second container fed to said outlet port, said filter means including a tortuous passage for said gas to said gas outlet port and filter material located in said tortuous passage.

7. The apparatus as defined by claim 2 wherein said feed tube is centrally located in said first chamber.

8. The apparatus as defined by claim 7 wherein said feed tube has a length at least equal to one half the length of said first chamber.

9. The apparatus as defined by claim 2 and additionally including means at said passage for restricting said second reagent from reaching said feed tube.

10. The apparatus as defined by claim 9 wherein said means for restricting includes filter material located in said passage.

11. The apparatus as defined by claim 9 wherein said means for restricting includes a screen at one end of said passage.

12. The apparatus as defined by claim 2 wherein said first and second containers comprise cylindrical containers.

13. The apparatus as defined by claim 12 wherein said first and second containers comprise inner and outer coaxial containers, respectively, and wherein said partition comprises a cylindrical wall of said inner container.

14. Apparatus for use in connection with a disposable gas generator utilized in a carbonated beverage dispenser, comprising:
    a pressure vessel for housing a disposable gas generator cartridge therein and including a top portion;
    a cover assembly for said pressure vessel and further comprising, a removable cover member locatable on the top portion of the pressure vessel and having a central opening therein, means for securing the cover member to the pressure vessel, and a body member mounted on said cover member and including gas outlet means and means passing through said central opening of said cover member for initiating gas generation within a gas generator cartridge when located in said pressure vessel; and an actuator assembly for operating said means for initiating gas generation and further comprising, lever means attached to a dispenser for locking said cover assembly in position on the dispenser so that said gas outlet means connects to complementary gas inlet means of said dispenser, and a rotatable member mounted on said lever means and having means thereon for contacting and operating said means passing through central opening when rotated to generate carbonating gas for the dispenser.

15. The apparatus as defined by claim 14 wherein said pressure vessel comprises an elongated cylinder.

16. The apparatus as defined by claim 15 wherein said cylinder comprises a circular cylinder, said cover member comprises a generally circular cover and wherein said means for securing the cover means comprises a locking ring for engaging the top portion of the pressure vessel.

17. The apparatus as defined by claim 14 wherein said means included in said body member for initiating gas generation comprises a spring biased pusher assembly.

18. The apparatus as defined by claim 17 wherein said body member includes a central axial bore therein and wherein said pusher assembly includes a bias spring and an elongated pusher member located in said body member bore.

19. The apparatus as defined by claim 18 wherein said pusher member includes a centrally located bore therethrough and having a spring biased needle member including a hollow end section located in said pusher member bore.

20. The apparatus as defined by claim 19 wherein said pusher member includes a pair of separated openings therein at one end, said one end being the inner end of the pusher member and wherein said hollow end section of said needle member includes respective openings adjacent said pair of separated openings for providing a gas passage therebetween through said needle member.

21. The apparatus as defined by claim 18 and additionally including a gas cartridge located in said pressure vessel, said cartridge further comprising a pair of coaxial cylindrical containers having a partition therebetween for defining first and second reagent chambers;
a reagent feed tube, including a removable closure member, located in said first chamber;
a passage between one end of said feed tube and said second chamber for permitting the travel of reagent between said chambers;
a first reagent in said first chamber and a second reagent in said second chamber, said first reagent and said second reagent chemically reacting to generate carbonating gas upon contact with each other, said second chamber including a region in the top portion thereof for holding the gas generated;
means operated by said pusher member for starting a reaction between said first and second reagents and including a predetermined portion of said second reagent in the top portion of said first chamber for contacting said first reagent in said top portion thereof for generating a gas thereat and causing a predetermined pressure to be applied to the top of said first reagent in said first chamber to urge said first reagent into the feed tube to remove said closure member and permit said first reagent to traverse said passage and contact said second reagent and thereby generate said gas in said second chamber; and
a gas port coupled to said gas outlet means included in said body member.

22. The apparatus as defined by claim 21 and additionally including filter means in the top portion of said second chamber for filtering said gas at the top portion of said second container and coupling filtered gas to said gas port.

23. The apparatus as defined by claim 21 wherein said first chamber includes a top wall and wherein said means for starting a reaction includes an inverted section of said top wall and an upwardly turned removable plug in said inverted section for holding said predetermined portion of said second reagent, said removable plug being dislodged from said inverted section by the operation of said pusher member.

24. The apparatus as defined by claim 23 wherein said inverted section comprises a domed shell including a flexible roof member engageable with said upwardly turned plug; said roof member when flexed by said pusher member springs toward said removable plug and dislodging said plug and releasing said predetermined portion of said second reagent.

25. The apparatus as defined by claim 17 wherein said rotatable member includes at least one cam means for operating said pusher assembly.

26. The apparatus as defined by claim 19 wherein said rotatable member includes a pair of cam means for independently depressing said pusher member and said needle type member when rotated.

27. The apparatus as defined by claim 26 wherein said rotatable member comprises a handwheel and wherein said pair of cam means comprises cams formed on one surface of the handwheel.

28. The apparatus as defined by claim 14 wherein said rotatable member includes an axle connected to said lever means and having an axle portion outwardly projecting therefrom and wherein said body includes a slot for engaging said axle portion when the rotatable member is rotated to a predetermined position for restraining movement of said lever means.

29. The apparatus as defined by claim 14 wherein said gas outlet means of said body member includes connector means and wherein said body member further includes gas inlet means, and gas channel means located between said gas inlet means and said connector means.

30. The apparatus as defined by claim 29 and additionally including vent valve means in said body member and being in communication with said gas channel means.

31. The apparatus as defined by claim 29 and additionally including flow restrictor means in said gas channel means for regulating the amount of gas allowed to reach said gas connector means.

32. The apparatus as defined by claim 29 and additionally including attitude sensitive valve means in said gas channel means for shutting off the gas channel means when said apparatus is positioned in a predetermined manner.

33. The apparatus as defined by claim 14 wherein said cover member includes a bore therethrough and relief valve means located at said bore for relieving pressure within the apparatus for an internal carbonating gas pressure of a predetermined magnitude.

* * * * *